United States Patent [19]

Young et al.

[11] Patent Number: 4,797,654

[45] Date of Patent: Jan. 10, 1989

[54] DATA FORMAT CONVERSION CIRCUIT

[75] Inventors: John S. Young, Scottsdale; Peter Kruis, Glendale; William D. Blewitt, Phoenix, all of Ariz.

[73] Assignee: GTE Communication Systems Corporation, Phoenix, Ariz.

[21] Appl. No.: 44,617

[22] Filed: May 1, 1987

[51] Int. Cl.[4] .................................................. H03M 7/00
[52] U.S. Cl. ........................................ 341/50; 370/58; 370/60
[58] Field of Search .................. 340/347 DD; 370/58, 370/60

[56] References Cited

U.S. PATENT DOCUMENTS

| 4,644,529 | 2/1987 | Amstutz et al. | 370/60 |
| 4,656,623 | 4/1987 | Dalby, Jr. et al. | 370/60 |
| 4,698,803 | 10/1987 | Haselton et al. | 370/60 |

Primary Examiner—William M. Shoop, Jr.
Assistant Examiner—Richard K. Blum Attorney, Agent, or Firm—Anthony Miologos; Frank J. Bogacz

[57] ABSTRACT

This circuit converts data in an ISDN data format to data in a T-carrier compatible data format and vice versa. The converted data is then stored in a memory for subsequent transmission. Due to the format differences, the data may be discontinuous. This circuit stores the data in memory in a contiguous fashion to promote and to facilitate the subsequent transmission of the data. This circuit includes a timing and control arrangement which indicates the size of each channel and frame of input data. This circuit generates memory addresses for the storage of both ISDN and T-carrier formatted data which are contiguous over multiple frames of data. A counting arrangement of this circuit converts data received in a modulo 32 format to stored data in a modulo 24 format or vice versa. In addition, this circuit provides output signals for generating proper framing bits and extended superframing information.

15 Claims, 6 Drawing Sheets

DATA FORMAT CONVERSION CIRCUIT

The present application is related to copending U.S. patent applications Ser. Nos. 07/044,858 and 07/044,616 which have the same inventive entity and are assigned to the same assignee as the present U.S. patent application.

BACKGROUND OF THE INVENTION

The present invention pertains to Integrated Services for Digital Networks (ISDN) and more particularly to circuitry for converting data in an ISDN compatible format and to data compatible with T-carrier formats and vice versa.

In general, an Integrated Services Digital Network is a system which provides end to end digital connectivity to a wide variety of services by users having multi purpose user network interfaces. ISDN systems provide voice switching, packet data switching, signalling networking and wideband networking capabilities.

ISDN systems typically provide for data transmission and reception employing a particular format. Usually, this format is incompatible with T-carrier data formats. The data transmission rates of ISDN systems and T-carrier facilities are typically in the megabit per second range. Conversion of data from the ISDN format to the T-carrier format and vice versa must be done rapidly. In addition, circuitry must operate both for receiving and transmitting data simultaneously.

Further, the reformatted data must be stored in contiguous memory locations. Any unused information must be removed from the data stream without destroying any contiguous valid data. The contiguity of data within the memory assures easy and rapid output by the transmission system.

Therefore, it is an object of the present invention to provide a high-speed data format conversion circuit for dynamically converting between T-carrier format and an ISDN format.

It is another object of the present invention to provide high-speed circuitry for generating proper framing for ISDN and T-carrier formatted data.

SUMMARY OF THE INVENTION

In accomplishing the objects of the present invention, there is provided a novel data format conversion circuit for high-speed conversion between T-carrier formats and an ISDN format.

The data format conversion circuit includes a timing and control circuit which provides load and once per channel signals which describe the number of bits per channel and the number of channels per frame, respectively. A selector is also included which is connected to the timing and control circuit. The selector counts modulo 32 and produces an enabling signal for each of the counts from 0 to 23.

A first address generator is connected to the selector and counts modulo 24. The modulo 24 counting is performed continuously for a predefined number of ISDN data frames. The first address generator produces contiguous memory addresses in the range of 0 through 95.

The data format conversion circuit also includes a counter which is connected to the selector. The counter provides channel and frame counting information and addresses which are modulo 32.

A second address generator is connected to the counter. The second address generator converts the modulo 32 addresses provided by counter to contiguous modulo 24 addresses for a predefined number of frames of ISDN data. These addresses are used to store data for transmission via T-carrier facilities or to an ISDN system.

DESCRIPTION OF THE PREFERRED EMBODIMENT

Figure 1:
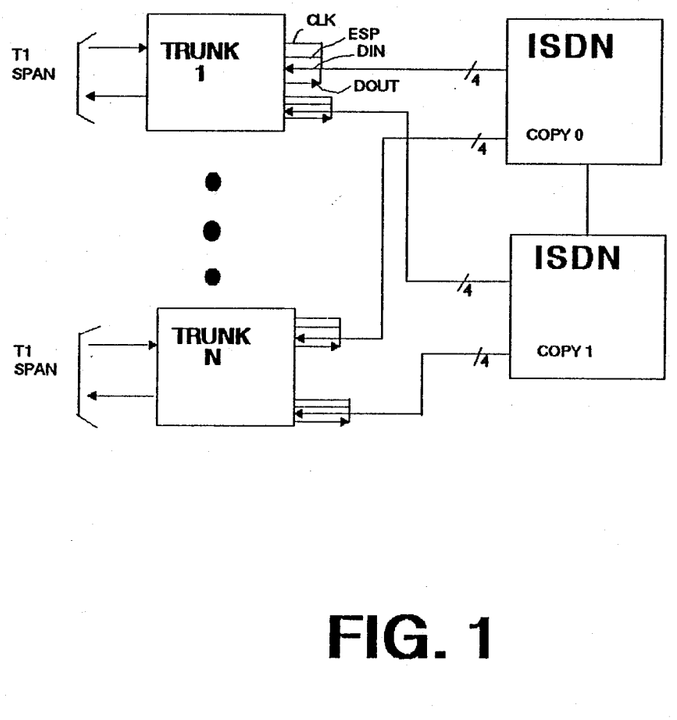
FIG. 1 is a block diagram of the primary trunk interface between T1 digital spans and an ISDN switching system.

FIG. 1 depicts the interconnection of the primary trunk circuit between a digital T1 span and duplex copies of an ISDN (Integrated Services Digital Network) system. ISDN copy 0 is connected via four leads to each of the trunk circuits. Copy 1 of the ISDN system is also connected via four similar leads to each trunk. Trunk circuits are shown in this system, however, line circuits for connecting the ISDN system to subscribers may be used in addition to trunk circuits or in place of the trunk circuits.

The four leads connecting each ISDN copy to a trunk or line include a clock signal CLK, a framing signal ESP, a serial data in signal DIN and a serial data out signal DOUT. The CLK signal is a 12.352 MHz signal which is sent from the ISDN system to the trunk. The 12.352 MHz signal is divided by four (4) to derive a 3.088 MHz signal for ISDN data. The 12.352 MHz signal supplied by the ISDN system is also divided by eight (8) to produce a 1.544 MHz signal for clocking data out via the T1 span. ESP is a framing signal for the data transmitted from the ISDN system to the trunk. The data DIN and data DOUT leads respectively transmit data to and from the trunk circuit. ISDN copy 0 and copy 1 are interconnected to provide for synchronous redundant operation.

Each trunk circuit is also connected to a T1 span. The T1 spans transmit data between the trunk and other distant trunks or switching systems.

Figure 2A:
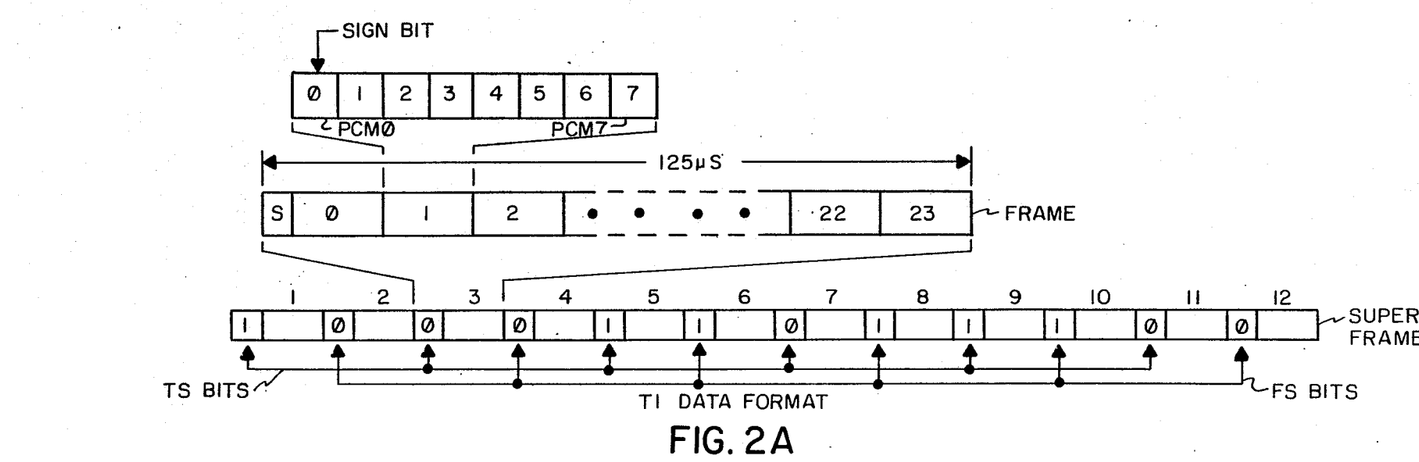
FIG. 2A is a frame layout of T1 data format.

The framing format of the data transmitted between the trunk circuit and distant trunks or switching systems (not shown) via the T1 lines is shown in FIG. 2A. This is a T1 line format based upon a standard 1.544M bits per second DS1 digital signalling format. The DS1 frame contains a 193 bits of information. This information is composed of a single synchronization or framing bit plus 192 bits of data. The 192 bits of data are organized into 24 channels of 8 bits each. Each 8 bit quantity may be referred to as a channel or an octet.

Each channel or octet consists of 8 bits, PCM0–PCM7. PCM0 is a sign bit. PCM1–PCM7 indicate the magnitude of the voice sample. By a strapping option on the trunk printed wiring card, the T1 data format shown in FIG. 2 may be provided. However, a preferred arrangement includes an "extended super framing format" which includes a CRC bit and data along with the framing bit distributed over a 24 frame sequence.

Figures 2B, 3:
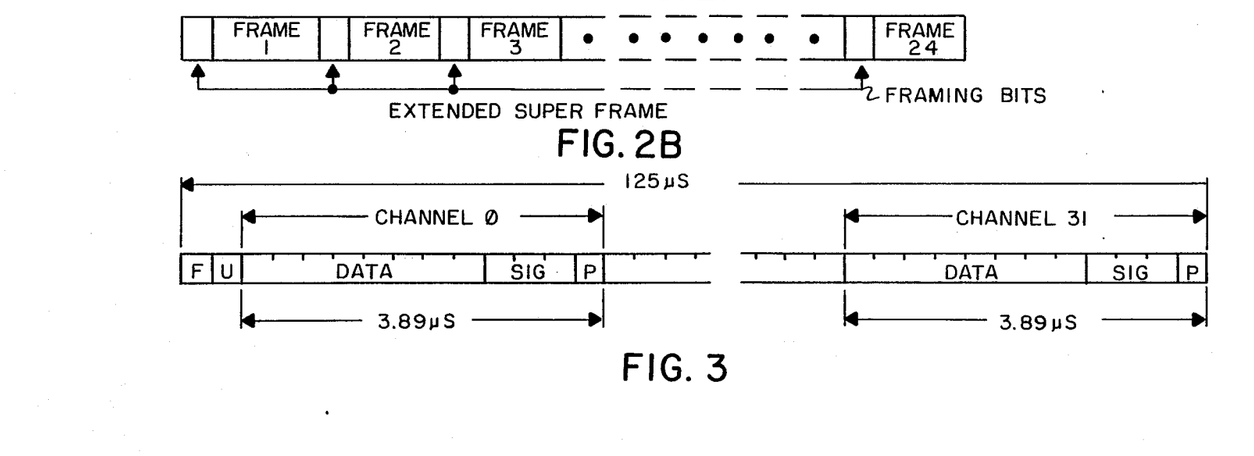
FIG. 2B is a frame layout of the extended framing format.
FIG. 3 is a frame format of data sent between the ISDN copy and the trunk.

Twenty-four channels are organized together with an S-bit to form a frame. Each sample in the frame is associated with one channel of voice or data. The channels are numbered 0 through 23. The S-bit carries a periodic pattern which, when detected, is used to identified the beginning of each frame of data. Twenty-four (24) frames of data are organized to form a superframe. This extended framing format is shown in FIG. 2B. The periodic pattern of data carried by the S-bit also makes it possible to identify the individual frames within a superframe. For the extended super framing format (ESF), the S-bits of frames 1, 5, 9, 13, 17 and 21 follow the bit pattern shown in FIG. 2A. These TS-bits and FS-bits provide for framing and frame number identification.

In the ESF format, the S-bits of frames 3, 7, 11, 15, 19 and 23 provide the cyclic redundancy check (CRC) function. The remaining S-bits provide a 4 KB/sec channel. At present 2 KB/sec of this channel are used for Zero Byte Time Slot Interchange (ZBTSI) encoding and flags.

FIG. 3 depicts the format of data transmitted between each ISDN copy and the trunk. One frame of data comprises 32 channels of information plus a F-bit and a U-bit. At present, the F bit is unused. The U bit is used for the transmission of information between the ISDN copy and a processor contained on the trunk circuitry.

Each channel includes 12 bits of information. The first 8 bits of each channel are the data bits (similar to the PCM0-PCM7 bits of the DS1 format). The information contained in these bits may be either data or voice information. Next, 3 bits are designated as SIG or signalling bits. Last, a parity bit follows the signalling bits. The parity bit carries odd parity over the other 11-bits of each channel.

Figure 4:
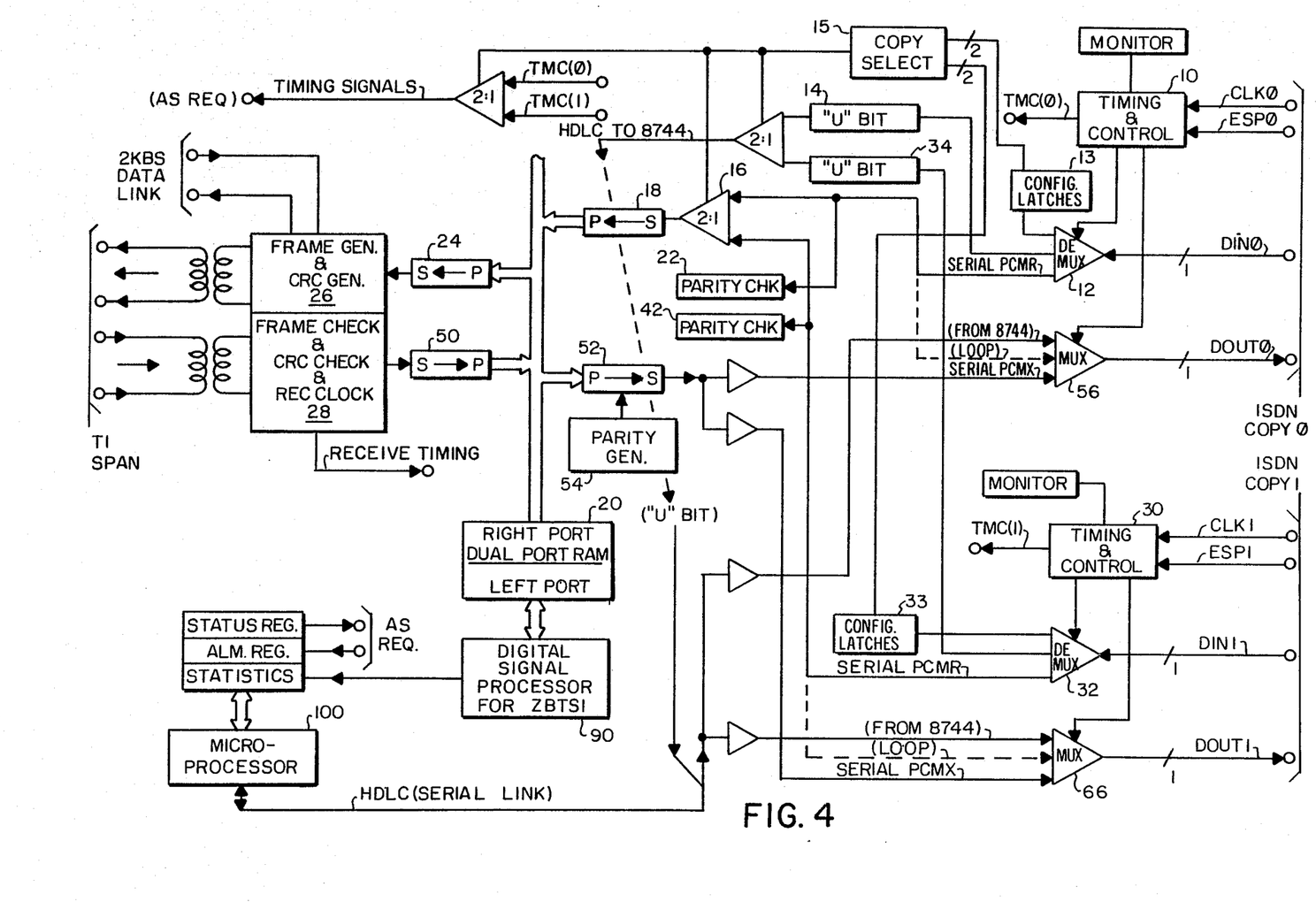
FIG. 4 is a block diagram of the trunk shown in FIG. 1.

Data shown in the format of FIG. 3 is transmitted from the ISDN copy 0 to demultiplexer 12 shown in FIG. 4. The 12 megahertz clock signal CLK and the framing signal ESP0 are both transmitted from ISDN copy 0 to timing and control circuit 10. Timing and control circuit 10 operates demultiplexer 12 to remove the F and U bits from the data stream. Since the F-bit is presently unused, it is discarded. Demultiplexer 12 transmits the U-bit to latch 14 where it is stored. Demultiplexer 12 then transmits the serial PCMR bit stream to 2 to 1 multiplexer 16 and to parity check circuit 22.

Parity check circuit 22 calculates the parity over each channel, that is, the 8 data bits and 3 signalling bits. The parity check circuit 22 then compares the calculated parity with the parity bit found in each channel to determine that each channel has properly been received. If a miscomparison is detected, the parity check circuit 22 generates an interrupt to the microprocessor 100.

Figure 5:
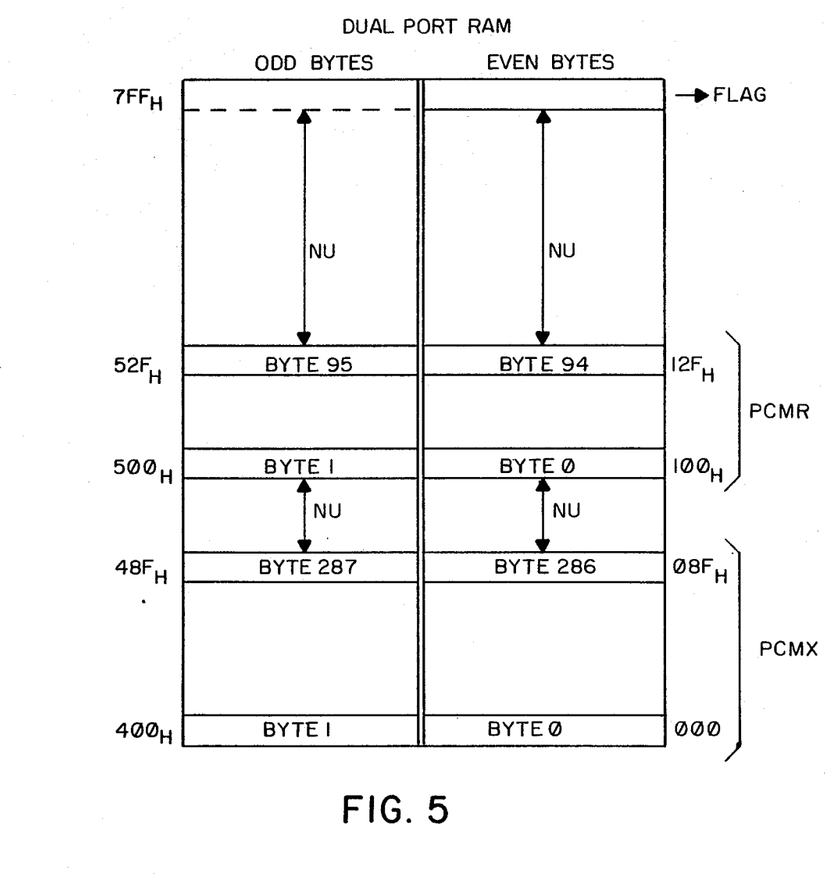
FIG. 5 is a memory layout of the dual port random access memory (RAM).

Two-to-one multiplexer 16 selects the serial PCMR data input from either copy 0 or copy 1 to be transmitted to the dual port RAM 20. Serial to parallel converter 18 converts the 8 data bits of each channel from serial to parallel and stores these 8-bits in dual port RAM 20 via the right port. The right port of RAM 20 is setup to alternately store bytes transmitted from converter 18 first in an even numbered byte and then in the next sequential odd numbered byte. This process is then repeated for each channel transmitted from the ISDN copy. A memory layout of the dual port RAM is shown in FIG. 5.

Similarly, ISDN copy 1 transmits data via the DIN1 lead to demultiplexer 32. Twelve megahertz clock CLK1 and framing signal ESP1 are transmitted to timing and control circuit 30. Demultiplexer 32 removes the F-bit and the U-bit. The F-bit is discarded since it is unused. U-bit is transmitted from demultiplexer 32 to latch 34 where it is stored.

The serial PCMR data received from ISDN copy 1 is transmitted from demultiplexer 32 to parity check circuit 42 and to multiplexer 16. Parity check circuit 42 calculates the parity over the 8 to data bits and 3 signalling bits of each channel and compares it with the parity bit transmitted in each channel. If a miscomparison is detected, parity check circuit 42 interrupts microprocessor 100 to set an alarm for this condition.

The signalling bits are removed from each channel of data transmitted from copy 1 and stored in config latches 33. The signalling bits from ISDN copy 0 are removed and stored in config latches 13. Each of the config latches 13 and 33 transmits two of the signalling bits to the copy select circuitry 15. With these bits the copy select circuitry determines which copy of the data transmitted from the ISDN system is to be output by the trunk on the T1 span. The copy select circuit controls multiplexer 16 in order to select the data stream from either copy 0 or copy 1 of the ISDN system.

After data has been stored in the dual port RAM 20 for transmission via the T1 span, digital signal processor 90 formats the data for transmission on the T1 span. This data is formatted according to the structure shown in FIG. 2B. Because the T1 system is capable of providing a 64 KBS (clear channel) transmission, the digital signal processor 90 performs a Zero Byte Time Slot Interchange (ZBTSI) scheme. This scheme insures that no more than 15 consecutive logic zeroes are transmitted on the T1 span. There are many techniques for Zero Byte Time Slot Interchange. The digital signal processor 90 may be programmed for any such scheme.

Digital signal processor 90 accesses dual port RAM 20 via a 16 bit wide bus. The data is then read out of RAM 20 one byte (8-bits) at a time. The data is transmitted from dual port RAM 20 to parallel to serial converter 24. The serial bit stream is then transmitted from converter 24 to frame generator and the Cyclic Redundancy Check (CRC) generator 26. Frame generator and CRC generator 26 adds the framing and CRC check bits to the data stream and places the resulting data on the T1 span for transmission to a distant system.

Data received from a distant system via the T1 span is transmitted to frame check, CRC check and received clock generation circuit 28. Circuit 28 removes and checks the framing and CRC bits with one which it has calculated. Circuit 28 generates an alarm if a miscomparison is detected. In addition, circuit 28 also recovers the data received clock signal which is 1.544 MB per second. The serial data is then transmitted from circuit 28 to serial to parallel converter 50. Converter 50 converts the data into 8-bit bytes and stores each byte in dual port RAM 20. Four frames of data must collected before it is determined whether a Zero Byte Time Slot Interchange scheme has altered any data bytes. If data bytes have been altered, the digital signal processor 90 reads and recovers the original data transmitted by the distant office. The recovered data is stored in memory 20.

When all the data has been recovered, the data is then transmitted 8-bits at a time from RAM 20 through parallel to serial converter 52. Parity generator circuit 54 generates the parity for each byte of information and inserts the parity bit into the serial bit stream PCMX. This serial bit stream is then transmitted to multiplexers 56 and 66. Timing and control circuit 10 enables multiplexer 56 to transmit the data via the DOUT0 lead to ISDN copy 0. Timing and control circuit 30 enables multiplexer 66 to transmit the serial PCMX data via the DOUT1 lead to ISDN copy 1. Each of the ISDN copies receive the same data, since one is the redundant backup unit for the other.

A Rockwell integrated circuit part number 8070 may be employed to achieve such functions in the circuitry shown as serial to parallel conversion, parallel to serial conversion, framing generation and checking and CRC generation and checking. Microprocessor 100 may be implemented with a microprocessor integrated circuit part number 8744. Digital signal processor 90 may be implemented with a Texas Instruments integrated circuit part number 32020. The digital signal processor 90 is a 16-bit wide processor which has an approximate instruction cycle time of 100 nanoseconds.

Figure 6:
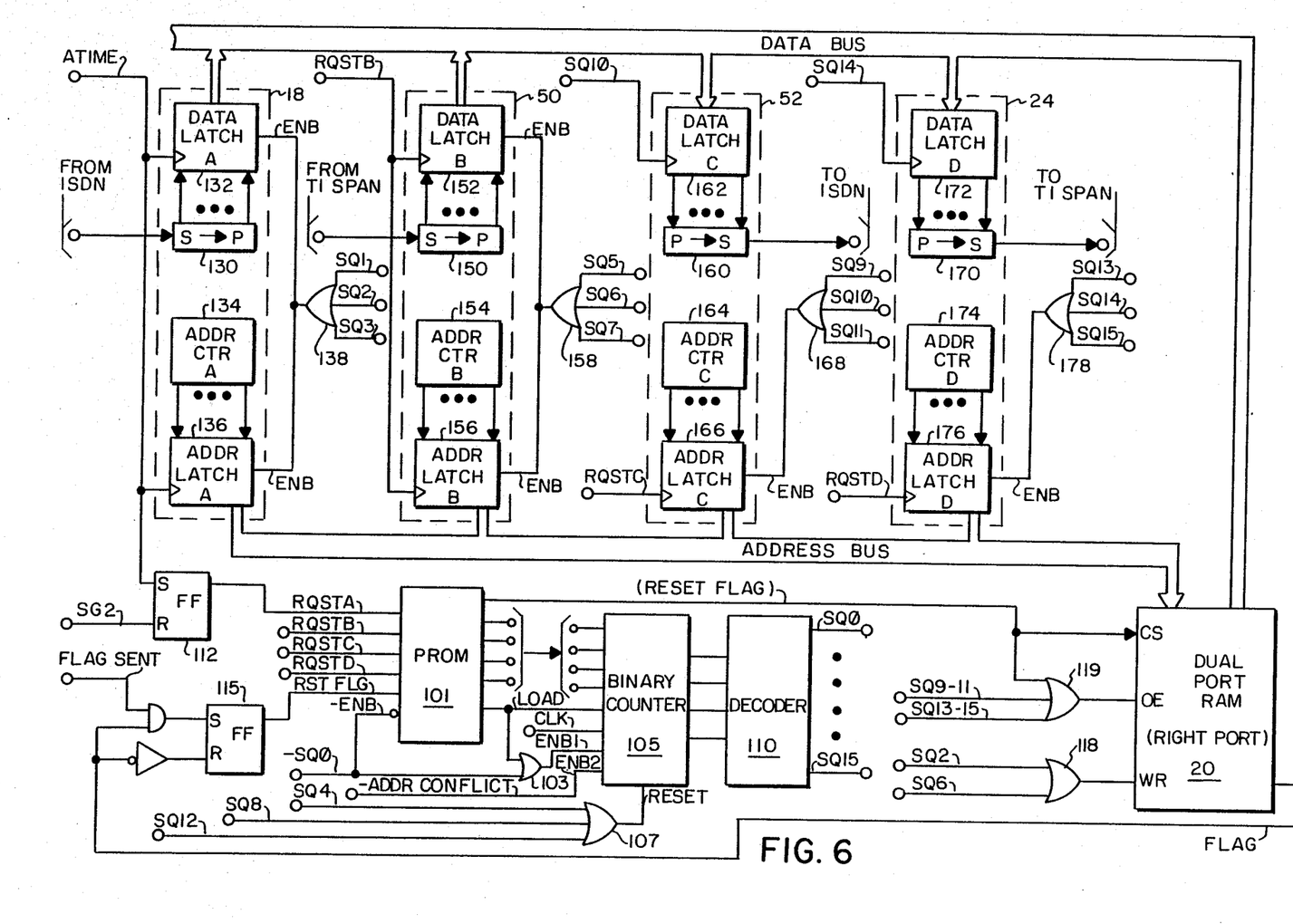
FIG. 6 is a state machine circuit for controlling access to RAM memory.

Referring to FIG. 6, the circuitry for controlling data transfer between the dual port RAM 20, the T1 span and the ISDN system is shown. For this portion of the explanation, it will be assumed that one byte of data has been transferred through multiplexer 16 from an ISDN switch into serial to parallel circuitry 18, as shown in FIG. 4.

The serial to parallel circuitry 18, as shown in FIG. 6, comprises serial to parallel shift register 130; data latch 132, which is connected between the data bus and serial to parallel shift register 130; address counter 134 and address latch 136, which is connected between address counter 134 and the address bus. Latches 132 and 136 and register 130 are each 8-bits wide.

Since serial data has been transmitted to register 130 from the ISDN system, a byte of information has been collected in register 130. At this point, the ATIME signal is generated by timing and control circuit 10 or 30. This causes the transfer of data from register 130 to latch 132 and the transfer of the corresponding address from address counter 134 to address latch 136. The ATIME signal also sets flip-flop 112 which in turn generates the RQSTA signal. In addition, the ATIME signal clocks latches 132 and 136. The generation of the RQSTA signal causes programmable read only memory (PROM) 101 to be read at the address indicated by the value of the RQSTA-RQSTD signals. As a result, the binary value 0001 is output to PROM 101 via the four output leads which connect PROM 101 to binary counter 105. Also, PROM 101 generates a load signal which causes binary counter 105 to be enabled via OR gate 103 and the ENB1 lead.

At the next cycle of the clock (not shown), the CLK signal causes binary counter 105 to be loaded with the four outputs of PROM 101. Binary counter 105 begins counting a sequence from the initial value input from PROM 101. This value is 1, so the counter begins counting from binary 1. In sequence, binary counter 105 produces signals on each of the leads SQ1, SQ2, SQ3 and SQ4 in response to further successive clock signals.

Each of the generated signals, SQ1 through SQ3, are transmitted from decoder 110 to OR gate 138 via the corresponding leads. For the duration of each of the signals SQ1 through SQ3, OR gate 138 enables data latch 132 to place the stored data byte on the data bus for transmission to RAM 20. OR gate 138 also enables address latch 136 to place the stored address onto the address bus for transmission to RAM 20.

Given the data byte and address from latch 132 and latch 136 respectively, RAM 20 stores the data byte at the indicated address. This occurs during the SQ2 signal, which enables OR gate 118 to produce the write (WR) signal. The SQ2 signal is also transmitted to flip-flop 112 and causes flip-flop 112 to reset the RQSTA signal.

Prior to the time the SQ4 signal is produced, the data write operation to RAM 20 is complete. When the signal SQ4 is produced by decoder 110, OR gate 107 is enabled and binary counter 105 is reset and stops counting. This terminates the data transfer operation for the particular byte of data which is received from the ISDN system.

Serial to parallel circuit 50 of FIG. 4 is shown in FIG. 6 in detail. Similar to circuit 18, circuit 50 includes a serial to parallel shift register 150; data latch 152, which is connected between the data bus and register 150; address counter 154; and address latch 156, which is connected between the address bus and address counter 154.

Similar to operation of circuit 18 above, when data is transmitted from the T1 span, a byte of information is collected by serial to parallel shift register 150. At the same time, the framing circuitry 28 generates the RQSTB signal. The RQSTB signal is also input to latches 152 and 156. This signal produces the binary value 0010 which is input to PROM 101. As a result, the PROM 101 outputs the binary value 0101 to counter 105. Counter 105 begins counting at 5.

In response, decoder 110 produces signals SQ5, SQ6, etc. on each successive clock cycle. Signals SQ5, SQ6 and SQ7 are transmitted from decoder 110 to OR gate 158 via the corresponding leads. During each of these signals, data latch 152 and address latch 156 are enabled. The data contained in data latch 152 is written at the address contained in address latch 156, during the SQ6 signal. The SQ6 signal will enable OR gate 118 to produce the write signal WR for writing the data byte into RAM 20. Also, the SQ6 signal clears the latch (not shown) which produces the RQSTB signal. When the counter 105 produces the SQ8 signal, OR gate 107 is enabled and binary counter is reset and stops counting. As a result, the data byte from the T1 span in stored in RAM 20 and no further SQ signals are produced. The operation for a transfer of a byte of data from the T-1 span to the memory is complete.

When data is to be transmitted to the ISDN system, the RQSTC signal is generated by timing and control circuit 10 or 30 via a latch (not shown). Parallel to serial circuit 52 controls this data transfer. The RQSTC signal is input to latch 166 and clocks latch 166 to transmit the stored address to RAM 20. PROM 101 outputs a binary code which causes counter 105 to begin counting at the number 9. As a result, decoder 110 sequentially outputs signals on the SQ9 through SQ11 leads.

Decoder 110 is connected to OR gate 168 via the SQ9 through SQ11 leads. When the SQ9 signal is output by decoder 110, address latch 166 is enabled onto the address bus and transmits the address of the address counter 164 to RAM 20. Also, during the signals SQ9 through SQ11, RAM 20 has its output enable (OE) input enabled by signals SQ9 through SQ11 via OR gate 119.

During signal SQ10 data latch 162 is enabled to latch the data byte transmitted from RAM 20 via the data bus. Also, the SQ10 signal resets the latch (not shown) which produces the RQSTC signal. Data latch 162 then transmits this data byte to parallel to serial shift register 160 for transmission to the ISDN system. When decoder 110 produces the SQ12 signal, the data has been read out of RAM 20 and OR gate 107 resets counter 105. Counter 105 stops counting. The transfer of a byte of data to the ISDN system is complete.

For the case in which data is to be transmitted from RAM 20 to the T1 span, parallel to serial circuit 24 of FIG. 4 operates as shown in detail in FIG. 6. The RQSTD signal is generated by frame generation circuit 26 which causes PROM 101 to produce a binary value, which in turn causes counter 105 to begin counting at the binary value of 13. The RQSTD signal is transmitted to latch 176 and clocks latch 176. This results in latch 176 transmitting the stored address to RAM 20. Decoder 110 is connected to OR gate 178 via the SQ13 through SQ15 leads. Decoder 110 produces signals on the SQ13 through SQ15 leads sequentially. The SQ13 through SQ15 leads are also connected via OR gate 119 to the output enable OE input of RAM 20.

During the signals SQ13 through SQ15, the data output of RAM 20 is enabled. Address latch 176 outputs the latched address via the address bus to RAM 20. This address is contained in address counter 174. During the SQ14 signal, data latch 172 stores the value output from RAM 20 on the data bus. The SQ14 signal also resets a latch (not shown) which produces the RQSTD signal. Data latch 172, then, transfers the data byte to parallel to serial converter 170. Converter 170 then transmits the data serially to the T1 span. At the end of signal SQ15, binary counter 105 produces the value 0, since it has cycled through all 16 counts. Next, the signal SQ0 is produced. This signal removes the enable from PROM 101 and counter 105 via OR gate 103. This completes the transfer of a data byte from RAM 20 to the T1 span.

If ZBTSI encoding has occurred, digital signal processor 90 sets a flag by writing to the high order address of RAM 20. The lowest order address bit of PROM 101 is the RESET FLAG signal. This signal is transmitted to RAM 20 and OR gate 119. As a result, the FLAG SIGNAL is produced. This signal is applied to the inputs of flip-flop 115. Flip-flop 115 sets and generates the RSTFLG signal input to PROM 101. Since no other read or write operation is in progress, PROM 101 transmits the RESET FLAG output signal, which in turn activates RAM 20. All address lines at this time are at logic 1. A read operation is generated which clears the flag signal and resets flip-flop 115.

The ADDR CONFLICT signal is generated by RAM 20, if the addresses input to RAM via the left and right ports are identical. For this occurrence, counter 105 is prevented from advancing to the next count, until the access of the digital signal processor 90 to left port is completed.

Figure 7:
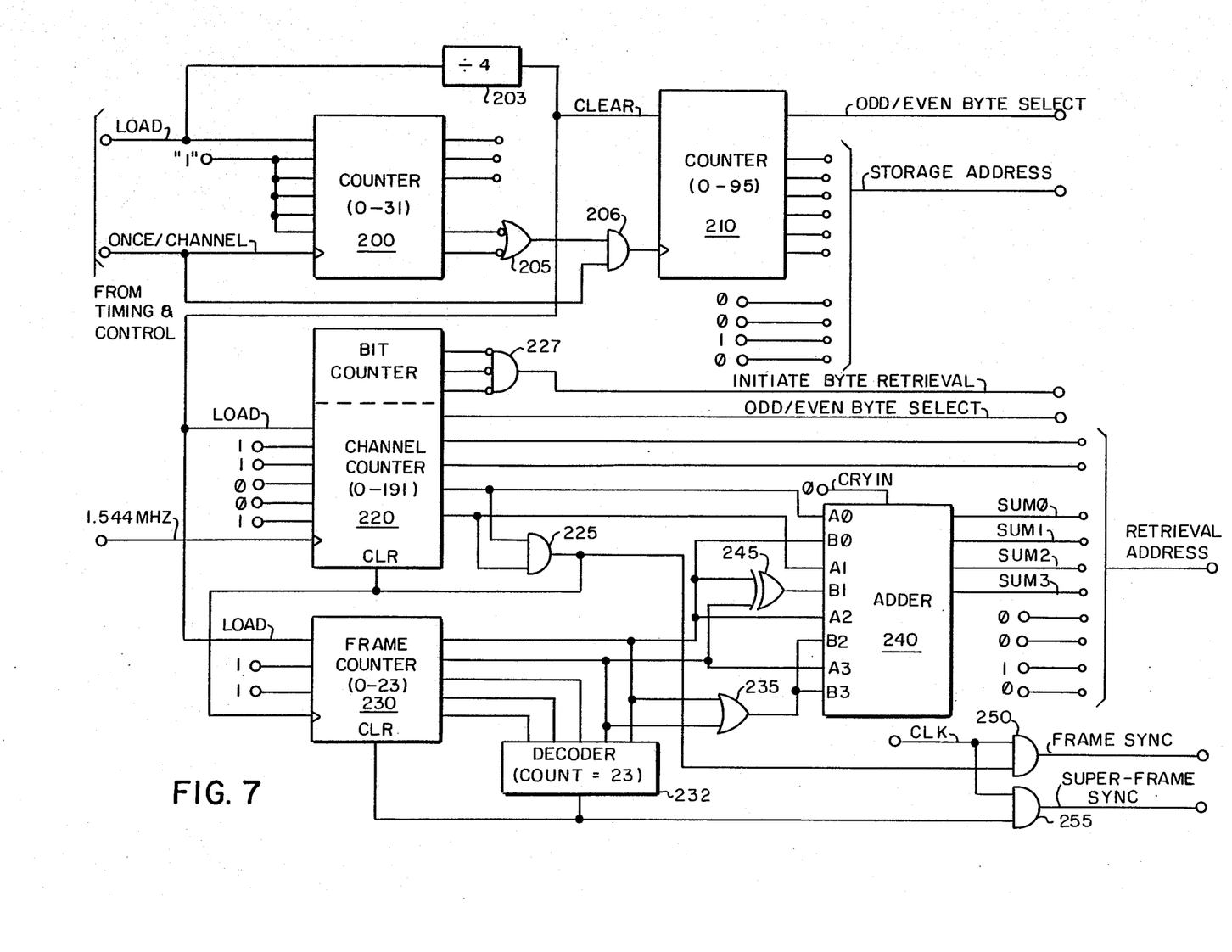
FIG. 7 is a memory address control circuit for RAM memory.

FIG. 7 depicts the circuitry for transferring information to and from RAM memory 20. Counter 200 is connected to the timing and control circuits 10 and 30 shown in FIG. 4 via the LOAD lead and the ONCE/CHANNEL lead. The other five inputs to counter 200 are set to logic 1. These inputs load the counter with the binary value of 31. The LOAD signal occurs for each channel of a frame of information transmitted from the ISDN system. The ONCE/CHANNEL signal occurs once every 12 bits transmitted from the ISDN system.

The timing and control circuit produces this signal by counting the bits. The LOAD signal is both derived from the ESP signal and transmitted from the ISDN system to the trunk circuit.

Referring to FIG. 3, it is to be remembered that the data format for data transmitted from the ISDN system to the trunk comprises 32 channels (0 through 31). Only 24 channels of information are required to be transmitted via the T1 span. As a result, channels 24 through 31 of the ISDN system data are at present unused and their contents may be discarded.

In FIG. 7, OR gate 205 is connected to the two high order outputs of counter 200. AND gate 206 is connected to OR gate 205 and to the timing and control circuits 10 and 30 via the ONCE/CHANNEL LEAD. Gate 205 detects channel counts in the range of 24 through 31 and inhibits gate 206 from operating to clock counter 210 during these channels. As a result, the data contained in channels 24 through 31 are discarded and not stored in RAM memory 20.

Counter 210 is connected to AND gate 206 and to divide by four circuit 203 via the CLEAR load. Divide by four circuit 203 is connected to timing and control circuitry via the LOAD lead. The CLEAR signal resets counter 210 once every four frames of data transmitted from the ISDN system. Counter 210 is also connected to RAM memory 20 and provides the address at which to write the particular data byte. Counter 210 functionally corresponds to address counters A and B, counters 134 and 154, as shown in FIG. 6. Each of the address counter circuits 134 and 154 may comprise the circuitry shown in FIG. 7.

The least significant bit of the address, provided to RAM 20 by counter 210, is the ODD/EVEN BYTE SELECT signal. It is to be noted that since RAM memory 20 is implemented with at least two memory chips, the ODD/EVEN BYTE SELECT signal determines which one of the two memory chips is written or read. The six next most significant bits of the address comprise the outputs of counter 210. The values of these six bits range from 0 through 95. The four most significant bits of the address are hard wired to the binary values of logic 0, logic 0, logic 1, and logic 0, respectively. As a result, each time gate 206 clocks counter 210, a sequential address is produced. This address causes each of the data bytes of the input ISDN system data stream to be stored at consecutive memory locations within RAM memory 20.

The output of divide by four circuit 203 is also transmitted to the LOAD input of counter 220. The LOAD signal causes counter 220 to be loaded in its most significant bits with the binary value 11001. This circuitry produces storage and retrieve addresses simultaneously. Data transmitted from the ISDN system must be stored in 96 contiguous locations, which do not overlap the address range from which data is being retrieved and transmitted to the T1 span. Loading counter 220 with the above mentioned binary value produces a suitable offset in the memory to avoid any overlap of data by the storage counter and the retrieval counter.

Although counter 220 is a single counter, it may be though of as being a bit counter and a channel counter. The three lower order bits, output by counter 220 via NAND gate 227, produce the INITIATE BYTE RETRIEVAL signal. This signal is used to read RAM memory. The next most significant bit produces the ODD/EVEN BYTE SELECT signal which selects one of the two memory chips, as mentioned above.

The next two most significant bits of the output of counter 220 form the two lower order bits of the RAM retrieval address. The two most significant bits of the five bits output by the channel counter portion of counter 220 are transmitted to AND gate 225. The output of AND gate 225 indicates that a count of 23 channels has been achieved. The output of gate 225 is connected to AND gate 250 along with a clock signal CLK. When the clock signal clocks AND gate 250, the FRAME SYNC signal is produced which causes the framing circuitry (not shown) to generate the framing pulse for that frame of T1 data.

Gate 225 is also connected to the frame counter 230 and to the clear input CLR of counter 220. Each time counter 220 counts 23, frame counter 230 is clocked. The two most significant output bits of counter 220 are also connected to adder 240 via the A0 and A1 inputs respectively.

Frame counter 230 counts from 0 to 23. When decoder 232 detects a count of 23, an output is generated and transmitted to the clear input (CLR) of frame counter 230 and to AND gate 255. On the next clock cycle, AND gate 255 produces the SUPER FRAME SYNC signal which causes the framing circuitry, not shown, to produce the super frame bit.

Frame counter 230 is forced loaded with binary logic 11 in the two low order bit positions when the LOAD signal is input to it. The LOAD signal is the output of gate 225. The five outputs of frame counter 230 are connected to decoder 232. The two least significant bits output by frame counter 230 are connected to OR gate 235. OR gate 235 is connected to both the B2 and B3 inputs of adder 240. The second least significant bit output by frame counter 230 is connected to the A3 input of adder 240 and to an input of EXCLUSIVE-OR gate 245. The least significant bit output by frame counter 230 is transmitted to exclusive OR gate 245, to the A2 input of adder 240 and to the B0 input of adder 240. The output of exclusive OR gate 245 is connected to the B1 input of adder 240. The CRYIN input of adder 240 is hard wired to logic 0. This is the carry input.

Two bits from the channel counter 220 along with the four outputs of adder 240 (bits SUM0 through SUM3) and 4 bits hard wired to logic 0010, respectively. These bits comprise the RAM retrieval address. This is the address from which data is read and sent to the T1 span for transmission. In order to retrieve the data previously stored in RAM memory 20, sequential addresses are provided to RAM memory to retrieve the 24 data bytes comprising each frame of T1 information. Since channel counter 220 produces channel counts from 0 to 31, corresponding to the ISDN system data, these channel counts must be altered to range from 0 to 23 for each frame in order to read each byte of the frame from RAM memory 20.

The five most significant bits of counter 220 along with the two least significant bits of frame counter 230 are input to adder 240 via gates 235 and 245 to achieve this function. Because the channel and frame counters 220 and 230 count modulo 32, adder 240 and its associated circuitry must produce a corresponding count modulo 24. The inputs and outputs of adder 240 are shown in table 1.

TABLE 1

| Input to adder 240 Range: | Output from adder 240 Range: |
|---|---|
| (1) 0–23 | (1) 0–23 |

TABLE 1-continued

| Input to adder 240 Range: | Output from adder 240 Range: |
|---|---|
| (2) 32–55 | (2) 24–47 |
| (3) 64–87 | (3) 48–71 |
| (4) 96–119 | (4) 72–95 |

When the inputs to adders 240 are in the range of 0 to 23 channel counts, the outputs of adder 240 correspond exactly to the inputs. However, since eight channels of information of each ISDN frame have been discarded from the data transmitted to the trunk circuit, the 24th channel of the retrieval address corresponds to the 32nd channel of input from the ISDN system. Adder 240 must disregard the counts between 24 and 31.

In the second range, for input addresses 32 through 55, adder 240 produces output addresses corresponding to contiguous memory locations 24 through 47. Between the second and third ranges, adder 240 must ignore counts 56 through 63. For input channel addresses 64 through 87, adder 240 produces contiguous output addresses 48 through 71. Lastly, adder 240 must ignore input addresses 88 through 95. For input addresses 96 through 119, adder 240 produces contiguous output addresses 72 through 95.

Again, the retrieval addresses are offset by a sufficient amount of memory location to prevent over writing by the storage address generation process. Therefore, for a modulo 32 count input, adder 240 and gates 235 and 245 produce a modulo 24 output on the SUM0 through SUM3 leads.

TABLE 2

| | | BIT NO. | | | |
|---|---|---|---|---|---|
| | | 3 | 2 | 1 | 0 |
| (1) | A-INPUTS | 0 | 0 | X | X |
| | B-INPUTS | 0 | 0 | 0 | 0 |
| | SUM-OUTPUTS | 0 | 0 | X | X |
| (2) | A-INPUTS | 0 | 1 | X | X |
| | B-INPUTS | 1 | 1 | 1 | 1 |
| | SUM-OUTPUTS | 0 | 0 | X | X |
| (3) | A-INPUTS | 1 | 0 | X | X |
| | B-INPUTS | 1 | 1 | 1 | 0 |
| | SUM-OUTPUTS | 0 | 1 | X | X |
| (4) | A-INPUTS | 1 | 1 | 0 | 0 |
| | B-INPUTS | 1 | 1 | 0 | 1 |
| | SUM-OUTPUTS | 1 | 0 | 0 | 1 |

Table 2 depicts the A inputs and B inputs to adder 240. Also shown is the SUM output bits (SUM-0–SUM3), resultant from the A and B input bits. An X indicates a don't care bit position. The four ranges correspond to the four ranges of numbers produced in Table 1. For each successive range of channel numbers, the B inputs add a predetermined number to the A inputs. For the first range, the B inputs add nothing since the ranges correspond exactly. For the second range, the B inputs are 1111 or hexadecimal F. This is equivalent to subtracting one. For the third range, the B inputs are 1110 or hexadecimal E. This is equivalent to subtracting two. Finally, for the fourth range of numbers, the B inputs are 1101 which is an hexadecimal D. This is equivalent to subtracting three.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. A data format conversion circuit for an ISDN system for high-speed conversion between T-carrier format data channels and ISDN format data channels, said data format conversion circuit being operated to store said ISDN data channels in a memory for subsequent transmission, said data format conversion circuit comprising:

timing and control means connected to said ISDN system, said timing and control means being operated to produce a load signal corresponding to each of said ISDN data channels transmitted from said ISDN system and said timing and control means being further operated to produce a once per channel signal corresponding to a number of bits contained with each of said ISDN data channels;

selecting means connected to said timing and control means, said selecting means being operated in response to said load signal and to said once per channel signal to produce an enabling signal for storing each of said ISDN data channels which include valid ISDN format data for conversion to said T-carrier format data channels;

first address generation means connected between said selecting means and said memory, said first address generation means being operated in response to said enabling signal to sequentially produce storage addresses for each of said converted T-carrier data channels, said first address generation means being further operated to produce counts modulo 24 for a predefined number of frames of said T-carrier data channels;

said selecting means being further operated to produce a second load signal;

counting means connected to said selecting means, said counting means being operated in response to said second load signal to produce T-carrier data channel counts in the range of 0 to 191 and said counting means being further operated to produce frame counts in the range of 0 to 23 providing for an extended superframing T-carrier format; and second address generation means connected between said counting means and said memory, said second address generation means being operated in response to said T-carrier channel counts and to said frame counts (modulo 32) to produce contiguous memory addresses (modulo 24) for storing said data channels corresponding to said channel and frame counts.

2. A data format conversion circuit as claimed in claim 1, wherein there is further included:

decoder means connected to said counting means, and decoder means being operated in response to a particular frame count of said counting means to produce a superframe indication signal; and first gating means connected to said decoder means and being operated in response to a clock signal and to said superframe indication signal to produce a superframe synchronization signal for generating extended superframe information.

3. A data format conversion circuit as claimed in claim 2, wherein there is further included second gating means connected to said counting means and being operated in response to said channel counts and to said clock signal to produce a frame synchronization signal for generating proper framing bits.

4. A data format conversion circuit as claimed in claim 3, said selecting means including:

second counting means being operated to produce counts in the range of 0 to 31; and inhibiting means connected to said second counting means and to said first address generation means, said inhibiting means being operated in response to counts in the range of 24 through 31 to inhibit the production of said enabling signal.

5. A data format conversion circuit as claimed in claim 4, wherein said selecting means further includes dividing means connected to said timing and control means via said load signal, to said first address generation means and to said counting means, said dividing means being operated in response to said load signal to divide said load signal by a predefined integer number to produce said second load signal.

6. A data format conversion circuit as claimed in claim 5, said first address generation means connected to said dividing means and being operated in response to said enabling signal and to said second load signal to produce counts in the range of 0 to 95.

7. A data format conversion circuit as claimed in claim 6, said counting means including:

channel counting means connected to said dividing means and being operated in response to said second load signal to produce a plurality of channel count signals indicating the binary value of each particular channel count in the range of 0 through 191; and frame counting means connected to said dividing means, to said channel counting means and to said decoder means, said frame counting means being operated to produce a plurality of frame counting signals representing the binary value of the frame count in the range of 0 to 23.

8. A data format conversion circuit as claimed in claim 7, wherein the connection of said channel counting means to said frame counting means further includes third gating means connected between two high order channel count signals of said channel counting means and said frame counting means, said third gating means being further connected to said second gating means to provide said frame synchronization signal.

9. A data format conversion circuit as claimed in claim 8, wherein there is further included fourth gating means connected to said channel counter means and to said memory means, said fourth gating means being operated in response to a plurality of low order channel counting signals to produce an initiate byte retrieval signal for selecting a particular location within said memory.

10. A data format conversion circuit as claimed in claim 9, wherein there is further included fifth gating means connected to said frame counting means via two low order frame counting signals and to said second address generation means.

11. A data format conversion circuit as claimed in claim 10, said fifth gating means including exclusive-OR gating means.

12. A data format conversion circuit as claimed in claim 11, wherein there is further included sixth gating means connected between said frame counting means via said two low order frame counting signals and said second address generation means.

13. A data format conversion circuit as claimed in claim 12, said sixth gating means including OR gating means.

14. A data format conversion circuit as claimed in claim 13, said second address generation means including adding means connected to said channel counting means, to said frame counting means, to said fifth gating means, to said sixth gating means and to said memory, said adding means being operated to produce a plurality of sum signals (modulo 24) indicating a memory address from which to retrieve data from said memory.

15. A data format conversion circuit as claimed in claim 14, said inhibiting means including:
- seventh gating means connected to said second counting means via two high order counting signal outputs; and
- eighth gating means connected to said seventh gating means, to said timing and control means via said once per channel signal and to said third counting means, said eighth gating means being operated to provide said enabling signal.

* * * * *